(12) United States Patent
Shen et al.

(10) Patent No.: US 8,798,182 B2
(45) Date of Patent: Aug. 5, 2014

(54) PRECODING METHOD AND APPARATUS (71) Applicant: Huawei Technologies Co., Ltd., Guangdong (CN)

(72) Inventors: Hui Shen, Shenzhen (CN); Bin Li, Shenzhen (CN); Yi Luo, Shenzhen (CN); Hufei Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/912,902

(22) Filed: Jun. 7, 2013

(65) Prior Publication Data

US 2013/0272445 A1 Oct. 17, 2013

Related U.S. Application Data

(63) Continuation of application No. PCT/CN2011/078787, filed on Aug. 23, 2011.

(30) Foreign Application Priority Data

Dec. 7, 2010 (CN) .......................... 2010 1 0585390

(51) Int. Cl.
*H04L 27/28* (2006.01)
(52) U.S. Cl.
USPC ........... 375/260; 375/148; 375/267; 375/346; 370/203; 370/208; 370/210; 370/328; 370/329; 370/330; 370/334; 455/63.1; 455/114.2; 455/114.3; 455/562.1
(58) Field of Classification Search
USPC .................. 375/260, 267; 370/203, 208, 210, 370/328–330, 334; 455/63.1, 114.2, 114.3, 455/562.1
See application file for complete search history.

(56) References Cited

U.S. PATENT DOCUMENTS

| 2007/0207730 | A1  | 9/2007 | Nguyen et al. |
| 2010/0062708 | A1* | 3/2010 | Sangiamwong et al. ....... 455/24 |
| 2011/0195678 | A1* | 8/2011 | Luo et al. .................. 455/114.3 |

FOREIGN PATENT DOCUMENTS

| CN | 101478814 A | 7/2009 |
| CN | 101674480 A | 3/2010 |
| CN | 101854234 A | 10/2010 |
| CN | 101867462 A | 10/2010 |
| EP | 2 120 500 A2 | 11/2009 |

(Continued)

OTHER PUBLICATIONS

Sampath, H.; Stoica, Petre; Paulraj, A., "Generalized linear precoder and decoder design for MIMO channels using the weighted MMSE criterion," Communications, IEEE Transactions on, vol. 49, No. 12, pp. 2198-2206, Dec. 2001.*

(Continued)

*Primary Examiner* — Daniel Washburn
*Assistant Examiner* — Eboni Hughes (57) ABSTRACT

A precoding method and apparatus are disclosed. The corresponding method includes: constructing a Lagrange function according to a precoding matrix, transmit power, a receive filter matrix and a weighting matrix, and obtaining a Lagrange multiplier by using the Lagrange function; updating the precoding matrix according to the Lagrange multiplier to obtain an iterative precoding matrix and an iterative receive filter matrix; obtaining an iterative Lagrange multiplier according to the iterative precoding matrix, the transmit power, the iterative receive filter matrix and the weighting matrix, and repeating the above steps in an iterative manner of updating the iterative precoding matrix according to the iterative Lagrange multiplier till the iterative precoding matrix converges to a threshold; and precoding information to be transmitted according to the iterative precoding matrix converging to the threshold.

11 Claims, 5 Drawing Sheets

(56) References Cited

FOREIGN PATENT DOCUMENTS

| JP | 2008109664 A | 5/2008 |
|---|---|---|
| WO | WO 01/97474 A2 | 12/2001 |
| WO | WO 2010/040190 A1 | 4/2010 |

OTHER PUBLICATIONS

International Search Report dated Nov. 17, 2011 in connection with International Patent Application No. PCT/CN2011/078787.
"Extension to Rel. 8 PMI feedback by adaptive codebook", 3GPP TSG RAN WG1 meeting #59, Nov. 9-13, 2009, Huawei, 4 pages.
Syed A. Jafar et al., "Degrees of Freedom for the MIMO Interference Channel", ISIT 2006, Jul. 9-14, 2006, p. 1452-1456.
Syed A. Jafar, et al., "Degrees of Fredom Region of the MIMO X Channel", IEEE Transactions on Information Theory, vol. 54, No. 1, Jan. 2008, p. 151-170.
Natasha Devroye, et al., "The Multiplexing Gain of MIMO X-Channels with Partial Transmit Side-Information", ISIT 2007, Jun. 24-29, 2007, p. 111-115.
Viveck R. Cadambe, et al., "Interference Alignment and Degrees of Freedom of the K-User Interference Channel", IEEE Transactions on Information Theory, vol. 54, No. 8, Aug. 2008, p. 3425-3441.
Viveck R. Cadambe, et al., "Interference Alignment on the Deterministic Channel and Application to Fully Connected Gaussian Inteference Networks", IEEE Transactions on Information Theory, vol. 55, No. 1, Jan. 2009, p. 269-274.
Raul Etkin, et al., "On the Degrees-of-Freedom of the K-User Gaussian Interference Channel", Jan. 13, 2009, p. 1-29.
Sriram Sridharan, et al., "A Layered Lattice Coding Scheme for a Class of Three User Gaussian Interference Channels", Sep. 25, 2008, 8 pages.
Krishna Gomadam, et al., "Approaching the Capacity of Wireless Networks through Distributed Interference Alignment", Global Communications Conference, Nov. 30-Dec. 4, 2008, p. 1-6.
Tiangao Gou, et al., "Degrees of Freedom of the K User M x N MIMO Interference Channel", Aug. 31, 2008, p. 1-28.
Roland Tresch, et al., "Cellular Interference Alignment with Imperfect Channel Knowledge", 2009 IEEE, 5 pages.
Hui Shen, et al., "The New Interference Alignment Scheme for the MIMO Interference Channel", 2010 IEEE, 6 pages.
Viveck R. Cadambe, et al., "Interference Alignment and Spatial Degrees of Freedom for the K User Interference Channel", Jul. 11, 2007, 30 pages.
Steven W. Peters, et al., "Interference Alignment Via Alternating Minimization", ICASSP 2009, p. 2445-2448.

* cited by examiner

PRECODING METHOD AND APPARATUS

CROSS-REFERENCE TO RELATED APPLICATIONS

This application is a continuation of International Application No. PCT/CN2011/078787, filed on Aug. 23, 2011, which claims priority to Chinese Patent Application No. 201010585390.5, filed on Dec. 7, 2010, both of which are hereby incorporated by reference in their entireties.

TECHNICAL FIELD

The present invention relates to the field of communications technologies, and in particular, to a method and an apparatus for implementing precoding in a distributed MIMO system.

BACKGROUND

Figure 1:
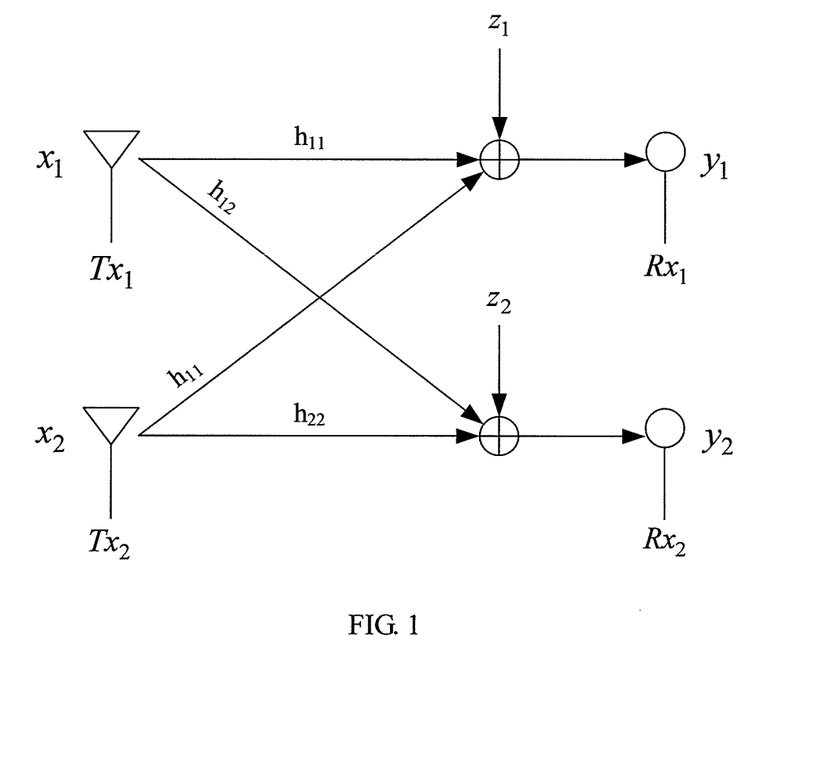
FIG. 1 is a schematic diagram of a two-user Gaussian interference channel in the prior art.

In a wireless communication system, mutual interference exists between signals of different users, and in a Gaussian interference channel, each user knows respective complete channel information, but data of different users cannot be shared, so joint transmission cannot be performed. FIG. 1 shows a two-user Gaussian interference channel, in which interference exists between the users $x_1$ and $x_2$. How to improve the capacity of the Gaussian interference channel while eliminating the interference between the users is always one of main bottlenecks limiting the development of the technology.

With deep research into the Gaussian interference channel, a method for cancelling interference between users by using interference alignment is proposed. In interference alignment, in the case that complete channel information is known, useful signals and interference signals of each receiving end are spatially separated by preprocessing at a transmitting end, and all interference with the receiving end caused by different transmitting ends is aligned to the same spatial dimension. In this way, the impact caused by the interference is prevented, and the capacity is improved.

Figure 2:
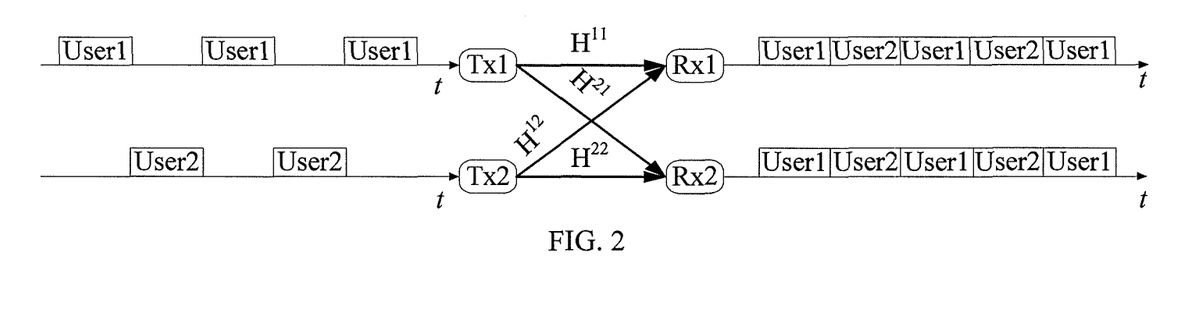
FIG. 2 is a schematic diagram of a TDMA system in the prior art.

To prevent interference between users, data may be transmitted in a TDMA mode shown in FIG. 2. That is, users transmit data at different time points. This prevents the interference between users. Compared with the system suffering from mutual interference in the case of simultaneous transmission by multiple users, the performance of TDMA is superior to that of the multi-user interference system. It can be seen from the schematic diagram that TDMA is capable of effectively preventing interference between users. Similar to TDMA, FDMA enables different users to transmit data at different frequencies, which also prevents the interference between users.

Figure 3:
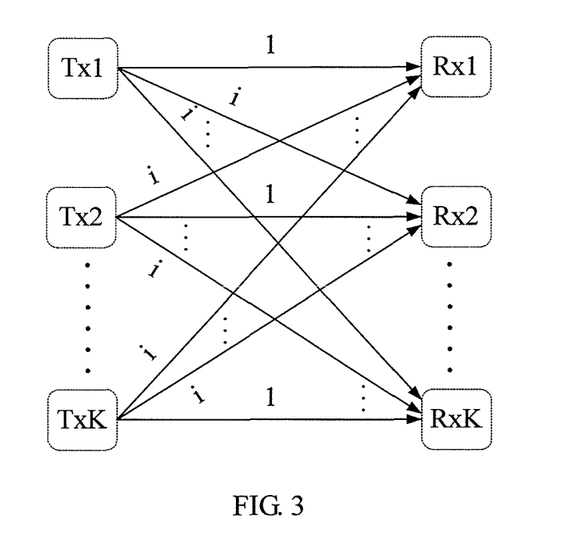
FIG. 3 is a schematic diagram of interference alignment on a special channel in the prior art.

The prior art proposes a method for interference alignment on a special channel, as shown in FIG. 3. K transmitting ends and K receiving ends exist, the channel response from each transmitting end to a destination receiving end is 1, and the interference channel response of each transmitting end to all users is i. If it is assumed that a transmit signal is a real part of a signal space, a receive signal of the $k^{th}$ receiving end is:

$$r_k = s_k + i \sum_{l=1, l \neq K}^{K} s_l + n_k$$

The above formula reveals that the receiving end can detect the transmit signal only by directly taking the real part of the receive signal, that is, $$\text{Re}(r_k) = \text{Re}\left(s_k + i \sum_{l=1, l \neq K}^{K} s_l + n_k\right) = \text{Re}(s_k + n_k)$$

Obviously, the signal space of the transmit signal is half consumed to eliminate the interference between users. The channel capacity of a single user may reach ½ log(SNR)+o (log(SNR)). When the number of users is greater than 2, the system achieves a greater gain over the original system capacity.

During the implementation of the present invention, the inventor discovers at least the following problems in the prior art.

The data transmitted in the TDMA mode is capable of avoiding interference, which, however, results in a low system capacity. The interference alignment on the special channel is difficult to construct in practice and therefore cannot be applied on an actual channel.

SUMMARY

Embodiments of the present invention provide a precoding method and apparatus, having the features of improving performance of a multi-user interference system, mitigating interference between users, and reducing information transfer and sharing required for user cooperative communication, and capable of effectively mitigating interference between users and improving the sum rate of the system.

A precoding method includes:

constructing a Lagrange function according to a precoding matrix, transmit power, a receive filter matrix and a weighting matrix, and obtaining a Lagrange multiplier by using the Lagrange function;

updating the precoding matrix according to the Lagrange multiplier to obtain an iterative precoding matrix and an iterative receive filter matrix;

obtaining an iterative Lagrange multiplier according to the iterative precoding matrix, the transmit power, the iterative receive filter matrix and the weighting matrix, and repeating the above steps in an iterative manner of updating the iterative precoding matrix according to the iterative Lagrange multiplier till the iterative precoding matrix converges to a threshold; and precoding information to be transmitted according to the iterative precoding matrix converging to the threshold.

A precoding apparatus includes:

a multiplier calculating unit, configured to construct a Lagrange function according to a precoding matrix, transmit power, a receive filter matrix and a weighting matrix, and obtain a Lagrange multiplier by using the Lagrange function;

an iterative multiplier unit, configured to update the precoding matrix according to the Lagrange multiplier to obtain an iterative precoding matrix and an iterative receive filter matrix;

an iterative precoding matrix unit, configured to obtain an iterative Lagrange multiplier according to the iterative precoding matrix, the transmit power, the iterative receive filter matrix and the weighting matrix, and repeat the above steps in an iterative manner of updating the iterative precoding matrix according to the iterative Lagrange multiplier till the iterative precoding matrix converges to a threshold; and a precoding unit, configured to precode information to be transmitted according to the iterative precoding matrix converging to the threshold.

It can be seen from the technical solutions provided in the embodiments of the present invention that, by iteratively calculating the precoding matrix by using the Lagrange multiplier till the final precoding matrix converges to the threshold, the present invention has the features of improving performance of a multi-user interference system, mitigating interference between users, and reducing information transfer and sharing required for user cooperative communication, and is capable of effectively mitigating interference between users and improving the sum rate of the system.

BRIEF DESCRIPTION OF THE DRAWINGS

To illustrate the technical solutions in the embodiments of the present invention more clearly, the following briefly describes the accompanying drawings for describing the embodiments of the present invention. Apparently, the accompanying drawings in the following description merely show some embodiments of the present invention, and persons of ordinary skill in the art can derive other drawings from these accompanying drawings without creative efforts.

DETAILED DESCRIPTION

The following clearly and completely describes the technical solutions according to the embodiments of the present invention with reference to the accompanying drawings in the embodiments of the present invention. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

This embodiment describes the technical solutions of the present invention by using a method for maximizing the sum rate using precoding in a distributed MIMO (Multiple-input Multiple-output, multiple-input multiple-output) system. The sum rate refers to joint transmission of multiple paths of signals on one channel by mitigating interference between users in an MIMO system. The greater the sum rate, the more data transmitted on the channel within the unit time, and the better the system performance. In the MIMO system, transmitting ends may be different base stations (for example, eNodeBs), or relay stations (for example, relay NodeBs), or different cells and different combinations thereof; and further the transmitting ends may be applied to the inter-eNodeB CoMP technology in LTE-Advanced. The process of obtaining an optimal solution when the maximization of the sum rate is used as a target equation is complex. Therefore, in the embodiment of the present invention, the optimal solution to the issue of maximizing the sum rate is obtained indirectly by minimizing the weighted mean square error. The specific evolution process is as follows.

(1) Use maximization of the sum rate as a target function to construct a Lagrange function and calculate the gradient of the Lagrange function to a precoding matrix.

In the distributed MIMO system, the attainable rate of the $k^{th}$ user is:

$$r_k = \log_2 \det(I_k + H_{kk} v_k v_k^H H_{kk}^H \Phi_k^{-1}) \quad (1)$$
$$= \log_2 \det(I_k + v_k^H H_{kk}^H \Phi_k^{-1} H_{kk} v_k)$$

where $$\Phi_k = \sigma_n^2 I + \sum_{i=1, i \neq k}^{K} H_{ki} v_i v_i^H H_{ki}^H,$$

indicating a variance matrix of interference plus noise.

On an interference channel, the receive filter matrix of a linear minimum mean square error (MMSE) receiving end is:

$$R_k^{MMSE} = v_k^H H_{kk}^H \left( \sum_{i=1}^{K} H_{ki} v_i v_i^H H_{ki}^H + \sigma_n^2 I \right)^{-1} \quad k \in \{1, \ldots, K\}$$

Under a linear MMSE receiver, the mean square error matrix is:

$$E_k = E\left[(R_k^{MMSE} Y_k - d_k)(R_k^{MMSE} Y_k - d_k)^H\right] \quad (2)$$
$$= [I_k + v_k^H H_{kk}^H \Phi_k^{-1} H_{kk} v_k]^{-1}$$

From formulas (1) and (2), it can be acquired that the attainable rate of the $k^{th}$ user under the linear MMSE receiver is:

$$r_k = \log_2 \det(E_k^{-1}) = \log_2 (\det E_k)^{-1} = -\log_2 \det(E_k) \quad (3)$$

Based on formula (3), the maximized weighted sum rate is represented by:

$$\max_{\{v_k\}} \sum_{k=1}^{K} \omega_k r_k$$
$$\text{s.t.} \quad tr(v_k v_k^H) = P_k \text{ for all } k \in \{1, \ldots, K\},$$

where $\omega_k$ indicates a weighting variable of the $k^{th}$ user, which is a scalar.

The above optimization issue may be re-written as:

$$\max_{\{v_k\}} \sum_{k=1}^{K} (-\omega_k r_k) \quad (4)$$

$$\text{s.t. } tr(v_k v_k^H) = P_k \text{ for all } k \in \{1, \ldots, K\}$$

With formula (4) as a constraint condition, a Lagrange function is constructed as follows:

$$L(v_k; \lambda_k) = \sum_{k=1}^{K} (-\omega_k r_k) + \sum_{k=1}^{K} \lambda_k [tr(v_k^H v_k) - P_k], \quad (5)$$

where $\lambda_k$ is a Lagrange multiplier.

With reference to the above formulas, the gradient of the Lagrange function to the precoding matrix is calculated as follows:

$$\frac{\partial L}{\partial v_k^*} = -\frac{1}{\ln 2} \omega_k H_{kk}^H \Phi_k^{-1} H_{kk} v_k E_k + \quad (6)$$

$$\frac{1}{\ln 2} \left( \sum_{i=1, i \neq k}^{K} \omega_i H_{ik}^H \Phi_i^{-1} H_{ii} v_i E_i v_i^H H_{ii}^H \Phi_i^{-1} H_{ik} \right) v_k + \lambda_k v_k$$

(2) Use minimization of the weighted mean square error as a target function to construct a Lagrange function and calculate the gradient of the Lagrange function to the precoding matrix.

On the interference channel, the minimized weighted mean square error may be represented by:

$$\min_{\{v_k; R_k\}} \sum_{k=1}^{K} tr(W_k MSE_k)$$

$$\text{s.t. } tr(v_k v_k^H) = P_k \text{ for all } k \in \{1, \ldots, K\},$$

where $W_k$ indicates a weighting matrix associated with a $k^{th}$ user, $MSE_k$ indicates a mean square error matrix of the $k^{th}$ user, and the formula of the mean square error matrix is:

$$MSE_k = E\left[(\hat{d}_k - d_k)(\hat{d}_k - d_k)^H\right]$$

$$= \left[ R_k \left( \sum_{j=1}^{K} H_{kj} v_j v_j^H H_{kj}^H \right) R_k^H - R_k H_{kk} v_k - \right.$$

$$\left. v_k^H H_{kk}^H R_k^H + I + \sigma_n^2 R_k R_k^H \right]$$

With minimization of the weighted mean square error as a constraint condition, the Lagrange function is constructed as follows:

$$\Gamma(v_k; R_k; \lambda_k) = \sum_{k=1}^{K} tr(W_k MSE_k) + \sum_{k=1}^{K} \lambda_k [tr(v_k^H v_k) - P_k],$$

where $\lambda_k$ is a Lagrange multiplier; according to the Karush-Kuhn-Tucker (KKT) condition:

$$\frac{\partial L}{\partial v_k^*} = 0, k \in \{1, \ldots, K\};$$

$$\frac{\partial L}{\partial R_k^*} = 0, k \in \{1, \ldots, K\};$$

the following expressions are obtained:

$$v_k = \left( \sum_{i=1}^{K} H_{ik}^H R_i^H W_i R_i H_{ik} + \lambda_k I \right)^{-1} H_{kk}^H R_k^H W_k \quad (7)$$

$$k \in \{1, \ldots, K\}$$

$$R_k = v_k^H H_{kk}^H \left( \sum_{i=1}^{K} H_{ki} v_i v_i^H H_{ki}^H + \sigma_n^2 I \right)^{-1} \quad k \in \{1, \ldots, K\} \quad (8)$$

$$tr(v_k^H v_k) = P_k \quad k \in \{1, \ldots, K\} \quad (9)$$

When a linear MMSE receiving end is used, $MSE_k$ changes to $E_k$; and therefore, the minimized weighted mean square error may be represented by:

$$\min_{\{v_k\}} \sum_{k=1}^{K} tr(W_k E_k) \quad (10)$$

$$\text{s.t. } tr(v_k v_k^H) = P_k \text{ for all } k \in \{1, \ldots, K\}$$

Its corresponding constructed Lagrange function is:

$$\Gamma(v_k; \lambda_k) = \Gamma(v_k; R_k^{MMSE}; \lambda_k) = \sum_{k=1}^{K} tr(W_k E_k) + \sum_{k=1}^{K} \lambda_k [tr(v_k^H v_k) - P_k] \quad (11)$$

With reference to the above formulas, the gradient of the Lagrange function to the precoding matrix is calculated as follows:

$$\frac{\partial \Gamma(v_k; \lambda_k)}{\partial v_k^*} = -H_{kk}^H \Phi_k^{-1} H_{kk} v_k E_k W_k E_k + \quad (12)$$

$$\left( \sum_{i=1, i \neq k}^{K} H_{ik}^H \Phi_i^{-1} H_{ii} v_i E_i W_i E_i v_i^H H_{ii}^H \Phi_i^{-1} H_{ik} \right) v_k + \lambda_k v_k$$

Comparison between formulas (6) and (12) shows that when $$W_k = \frac{1}{\ln 2} \omega_k E_k^{-1}, \quad (13)$$

the gradients of the Lagrange function to the precoding matrix as regards the two optimization issues are the same.

Therefore, it can be acquired that the optimal solution to the issue of optimizing the weighted sum rate satisfies the KKT condition $$\frac{\partial L^-}{\partial v_k^*} = 0.$$

That is, if the weighting matrix is formula (13), the gradient of the Lagrange function for minimizing the weighted mean square error to the precoding matrix is also zero, which also corresponds to the optimal solution to the issue of the weighted MMSE. However, the optimal solution to the weighted MMSE issue may be obtained by using the iterative algorithms designed in formulas (7), (8) and (9). Accordingly, in the embodiment of the present invention, the issue of maximizing the weighted sum rate on the interference channel may be addressed by using the weighted MMSE design and by selecting a specific weighting matrix.

Based on the above theory, the following describes the embodiment of the present invention in detail.

As shown in FIG. 3, the method may specifically include the following steps.

Figure 4:
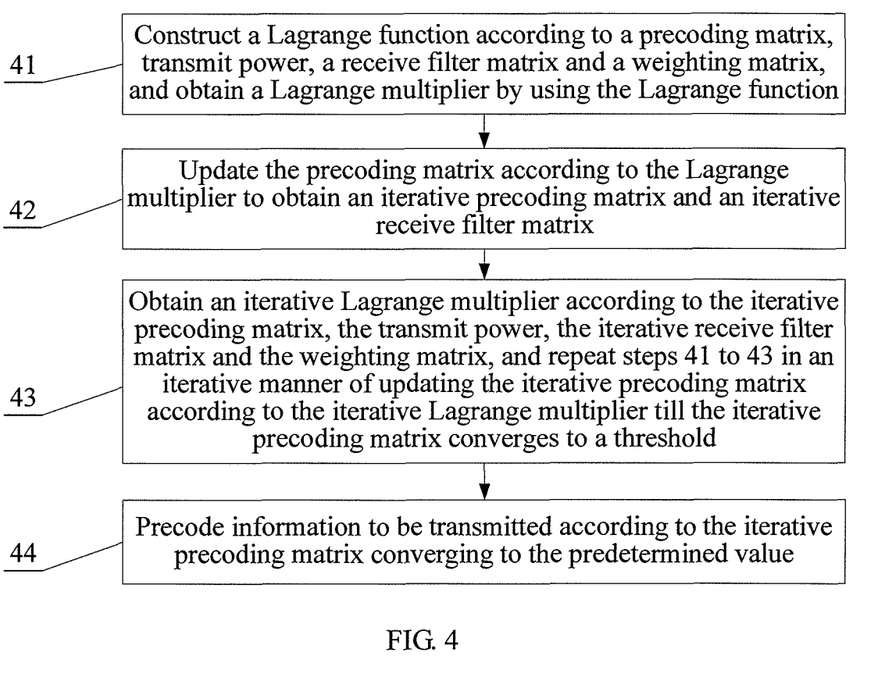
FIG. 4 is a schematic flow chart of a precoding method according to an embodiment of the present invention.

Step 41: Construct a Lagrange function according to a precoding matrix, transmit power, a receive filter matrix and a weighting matrix, and obtain a Lagrange multiplier by using the Lagrange function.

Specifically, related parameters for calculating the Lagrange multiplier are obtained first, including the precoding matrix, the transmit power, the receive filter matrix and the weighting matrix.

In an interference system with K (K is a natural number) users, K transmitters and K users exist concurrently, where the number of antennas at the $K^{th}$ transmitting end is $M_k$, the $K^{th}$ user has $N_k$ antennas, the $K^{th}$ transmitting end transmits $D_k$ streams to the corresponding $K^{th}$ user, and the power of the $k^{th}$ transmitter is $P_k$. The equation of this system is:

$$Y_k = \sum_{l=1}^{L} H_{kl} X_l + n_k$$
$$= \sum_{l=1}^{L} H_{kl} v_l d_l + n_k$$
$$= H_{kk} v_k d_k + \sum_{l \neq k} H_{kl} v_l d_l + n_k,$$

where $Y_k$ indicates a receive signal vector k of a $k^{th}$ user, $H_{kl}$ indicates a channel coefficient matrix from an $l^{th}$ transmitter to the $k^{th}$ user, $X_l$ indicates a signal (precoded signal) transmitted by the $l^{th}$ transmitting end, $n_k$ indicates an AWGN noise vector of $N_k \times 1$, $v_k$ indicates a precoding matrix of M rows multiplied by N columns of the $K^{th}$ transmitter, and $d_k$ indicates a vector of data to be transmitted by the $k^{th}$ transmitter. The total power of the $l^{th}$ transmitter is $E[\|X_l\|^2] = P_l$.

First, an initial value of the precoding matrix, that is, a precoding matrix, is obtained by using the system equation. Then, the corresponding weighting matrix may be obtained by using the following formula:

$$W_k = \frac{1}{\ln 2} \omega_k E_k^{-1},$$

where $W_k$ indicates a weighting matrix associated with a user k, $\omega_k$ indicates a weighting variable of the $k^{th}$ user, and $E_k^{-1}$ indicates an inverse matrix of an error matrix of the $k^{th}$ user.

Then, the corresponding receive filter matrix is obtained by calculation using the following formula:

$$R_k = v_l^H H_{kl}^H \left( \sum_{l=1}^{L} H_{kl} v_l v_l^H H_{kl}^H + \sigma_n^2 I \right)^{-1}$$

where L indicates the total number of transmitting ends, $R_k$ indicates a receive filter matrix of the $k^{th}$ receiving end, $v_l$ indicates a precoding matrix of the $l^{th}$ transmitting end, $v_l^H$ indicates a conjugate transpose matrix of $v_l$, $H_{kl}$ indicates a channel coefficient matrix from the $l^{th}$ transmitting end to the $k^{th}$ receiving end, $H_{kl}^H$ indicates a conjugate transpose matrix of $H_{kl}$, $\sigma_n^2$ indicates a channel noise variance, and I indicates a identity matrix.

Finally, the transmit power is an inherent property of a transmitting end device, and may be directly obtained from the transmitting end.

On the interference channel, the Lagrange function may be constructed by minimizing the weighted mean square error. The expression of the minimization of the weighted mean square error is:

$$\min_{\{v_k; R_k\}} \sum_{k=1}^{K} tr(W_k MSE_k)$$
$$\text{s.t.} \quad tr(v_k v_k^H) = P_k \text{ for all } k \in \{1, \ldots, K\},$$

where $W_k$ indicates a weighting matrix associated with the user k, and $MSE_k$ indicates a mean square error matrix of the $k^{th}$ user, which is expressed by:

$$MSE_k = E\left[(\hat{d}_k - d_k)(\hat{d}_k - d_k)^H\right]$$
$$= \left[ R_k \left( \sum_{j=1}^{K} H_{kj} v_j v_j^H H_{kj}^H \right) R_k^H - R_k H_{kk} v_k - v_k^H H_{kk}^H R_k^H + I + \sigma_n^2 R_k R_k^H \right],$$

According to the related parameters for calculating the Lagrange multiplier and the expressions of $W_k$ and $MSE_k$, the Lagrange function is constructed as follows:

$$\Gamma(v_k : R_k : \lambda_k) = \sum_{k=1}^{K} \text{trace}(W_k MSE_k) + \sum_{k=1}^{K} \lambda_k [\text{trace}(v_l^H v_l) - P_l],$$

where $v_k$ indicates an initial precoding matrix of the $k^{th}$ transmitting end, $R_k$ indicates a receive filter matrix of the $k^{th}$ receiving end, $\lambda_k$ indicates a Lagrange multiplier, trace indicates a matrix trace, that is, the sum of diagonal elements in the matrix, $W_k$ indicates a weighting matrix associated with the $k^{th}$ user, $MSE_k$ indicates a mean square error matrix of the $K^{th}$ user, $v_l^H$ indicates a conjugate transpose matrix of $v_l$, and $P_l$ indicates the total power of the $l^{th}$ transmitter.

Step 42: Update the precoding matrix according to the Lagrange multiplier to obtain an iterative precoding matrix and an iterative receive filter matrix.

Specifically, with reference to the above Lagrange function and according to the KKT (Karush-Kuhn-Tucker) condition:

$$\frac{\partial L}{\partial v_k^*} = 0 \quad k \in (1, \ldots, K)$$

$$\frac{\partial L}{\partial R_k^*} = 0 \quad k \in (1, \ldots, K),$$

the following expressions may be obtained:

$$v_k = \left(\sum_{i=1}^{K} H_{ik}^H R_i^H W_i R_i H_{ik} + \lambda_k I\right)^{-1} H_{kk}^H R_k^H W_k \quad \text{(a)}$$

$$k \in \{1, \ldots, K\}$$

$$R_k = v_l^H H_{kl}^H \left(\sum_{l=1}^{L} H_{kl} v_l v_l^H H_{kl}^H + \sigma_n^2 I\right)^{-1} \quad k \in \{1, \ldots, K\} \quad \text{(b)}$$

$$\text{trace}(v_k^H v_k) = P_k \quad k \in \{1, \ldots, K\} \quad \text{(c)}$$

In formula (1), $$v_l = \left(\sum_{k=1}^{K} H_{kl}^H R_k^H W_k R_k H_{kl} + \lambda_k I\right)^{-1} H_{kl}^H R_k^H W_k,$$

where $H_{kl}$ indicates a channel coefficient matrix from the $l^{th}$ transmitting end to the $k^{th}$ receiving end, $H_{kl}^H$ indicates a conjugate transpose matrix of $H_{kl}$, $R_k$ indicates a receive filter matrix of the $k^{th}$ receiving end, $R_k^H$ indicates a conjugate transpose matrix of $R_k$, $W_k$ indicates a weighting matrix, $\lambda_k$ indicates a Lagrange multiplier, I indicates a identity matrix, and $X_l$ indicates a signal transmitted by the $l^{th}$ transmitting end. In formula (b), $R_k$ indicates a receive filter matrix of the $k^{th}$ receiving end, L indicates the total number of transmitting ends, $v_l$ indicates a precoding matrix of the $l^{th}$ transmitting end, $v_l^H$ indicates a conjugate transpose matrix of $v_l$, $H_{kl}$ indicates a channel coefficient matrix from the $l^{th}$ transmitting end to the $k^{th}$ receiving end, $H_{kl}^H$ indicates a conjugate transpose matrix of $H_{kl}$, $\sigma_n^2$ indicates a channel noise variance, and I indicates a identity matrix. In formula (c), trace indicates a matrix trace, that is, the sum of diagonal elements in the matrix, $v_l$ indicates an initial precoding matrix of the $l^{th}$ transmitting end, $v_l^H$ indicates a conjugate transpose matrix of $v_l$, and $P_l$ indicates transmit power $P_l = E[\|X_l\|^2]$ of the $l^{th}$ transmitting end.

The updated precoding matrix $v_k$ is obtained by calculation using the Lagrange multiplier $\lambda_k$ and according to formula (a), where $k \in (1, \ldots, K)$. Subsequently, the iterative receive filter matrix $R_k$ is calculated according to the obtained precoding matrix $v_k$ and by using the following formula:

$$R_k = v_l^H H_{kl}^H \left(\sum_{l=1}^{L} H_{kl} v_l v_l^H H_{kl}^H + \sigma_n^2 I\right)^{-1}.$$

Then, the iterative Lagrange multiplier $\lambda_k$ is obtained by calculation using the updated precoding matrix $v_k$ and according to formulas (a) and (c), where $k \in (1, \ldots, K)$.

Step 43: Obtain an iterative Lagrange multiplier according to the iterative precoding matrix, the transmit power, the receive filter matrix and the weighting matrix, and repeat steps 41 to 43 in an iterative manner of updating the iterative precoding matrix according to the iterative Lagrange multiplier till the iterative precoding matrix converges to a threshold.

By using formulas (a), (b) and (c), the iterative Lagrange multiplier is obtained by calculation according to the iterative precoding matrix, and the iterative precoding matrix is obtained by several iterative calculations according to the iterative Lagrange multiplier, where each iterative calculation uses the iterative precoding matrix obtained by a previous iterative calculation to obtain a new iterative Lagrange multiplier till the iterative precoding matrix converges to a threshold. Specifically, as regards convergence to the threshold, a convergence criterion may be set as a flag indicating ending of convergence. For example, the criterion may be that the number of iterations reaches a predetermined value, or a Frobenius norm of the difference between the iterative precoding matrix and the iterative precoding matrix obtained by the previous calculation is smaller than a threshold. Setting of the corresponding predetermined value of the number of iterations or the threshold of the Frobenius norm may be subject to maximization of the weighted sum rate. A specific weighting matrix may be selected to obtain a maximized weighted sum rate. When the following KKT condition is satisfied:

$$\frac{\partial L}{\partial v_k^*} = 0 \quad k \in (1, \ldots, K)$$

If the weighting matrix is selected according to the following formula (d), $$W_k = \frac{1}{\ln 2} \omega_k E_k^{-1}(d),$$

the weighting matrix $W_k$ for maximizing the weighted sum rate may be obtained.

Step 44: Precode information to be transmitted according to the iterative precoding matrix converging to the threshold.

Specifically, information to be transmitted in each transmitter may be precoded by using the iterative precoding matrix converging to the threshold and according to the existing coding method in the MIMO system; and after receiving signals, each user at the receiving end performs corresponding detection for the signals and uses a useful signal as a receive signal.

Figure 5:
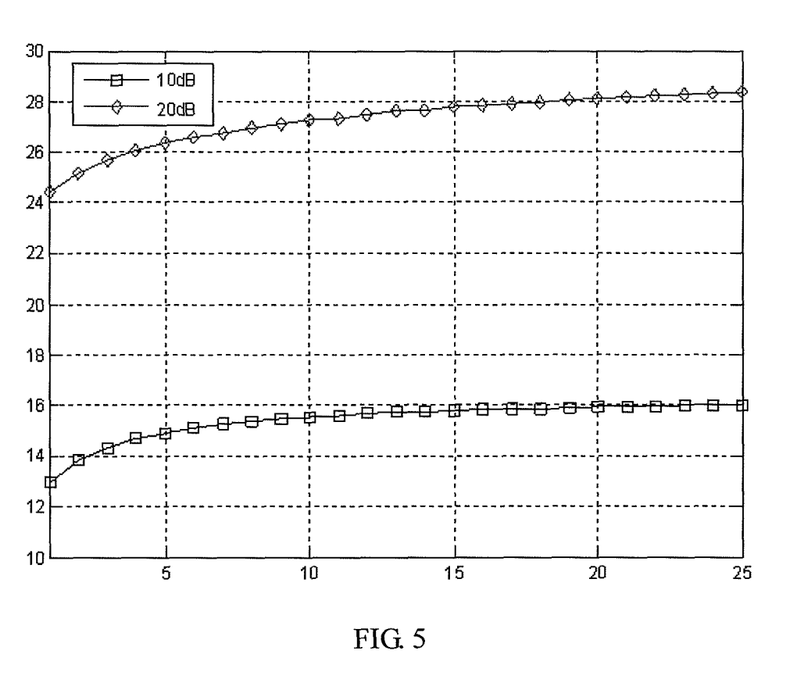
FIG. 5 is a coordinate diagram of a relationship between the number of iterations and the sum rate in the existing interference alignment method, where the horizontal axis indicates the number of iterations, and the vertical axis indicates the sum rate.
Figure 6:
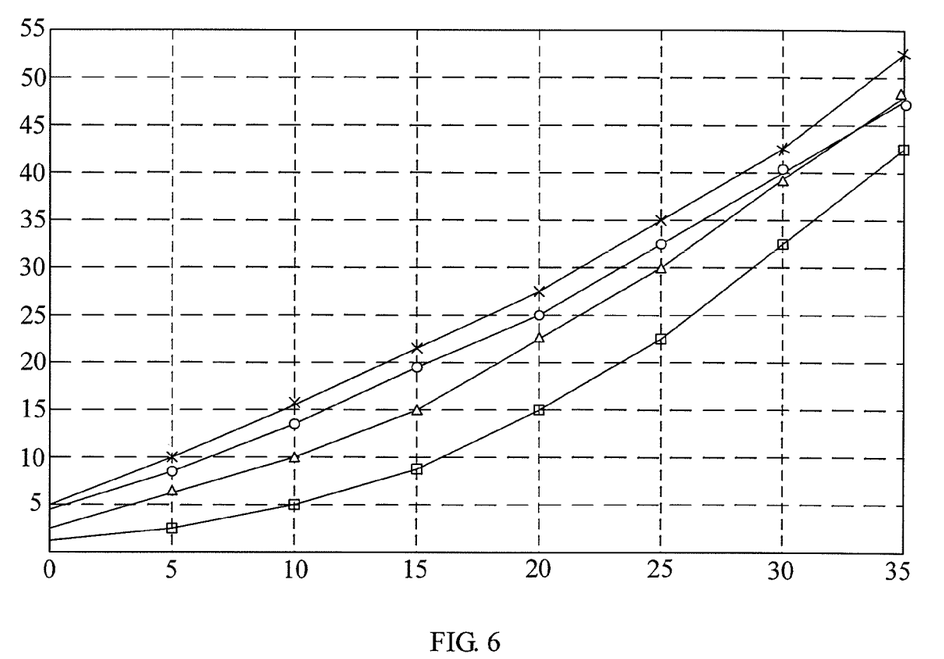
FIG. 6 is a coordinate diagram of a relationship between the number of iterations and the sum rate according to an embodiment of the present invention, where the horizontal axis indicates the number of iterations, and the vertical axis indicates the sum rate.

The following uses a simulation system to verify the technical effects. Assume that antenna configuration is represented by $\{K;(Nt_k, Nt_{k-1}, \ldots, Nt_1), (Nr_k, Nr_{k-1}, \ldots, Nr_1)\}$ where k indicates the number of users, $Nt_i$ indicates the number of transmitting antennas of the $i^{th}$ transmitter, $Nr_i$ indicates the number of receiving antennas of the $i^{th}$ receiver; if $Nt_i = Nr_i$, and i=1, 2, ..., K, the antenna configuration is simply represented by $\{K;(Nt_k, Nt_{k-1}, \ldots, Nt_1)\}$. In the simulation system, considering a three-user MIMO interference channel system, K=3; the number of transmitting antennas of each transmitter is four, $M_1=M_2=M_3=4$; the number of receiving antennas of each user is four, $N_1=N_2=N_3=4$, that is, the antenna configuration is $\{3;(4,4,4), (4,4,4)\}$. Each transmitter transmits two streams, where $D_1=D_2=D_3=2$, and QPSK modulation is used. It can be seen from FIG. 5 that, according to the coding method in the existing interference alignment method, with the increase of the number of iterations, the obtained value of the average sum rate tends to reach saturation after increasing to a specific value. However, it can be seen from FIG. 6 that, according to the coding method provided in this embodiment, with the increase of the number of iterations, the average sum rate obtained when the sum rate is maximized achieves a great improvement over the sum rate performance of the existing interference alignment solution (Explicit IA, distributed IA, or distributed Max-SNR solution).

Therefore, by iteratively calculating the precoding matrix by using the Lagrange multiplier till the final precoding matrix converges to the threshold, this embodiment has the features of improving performance of a multi-user interference system, mitigating interference between users, and reducing information transfer and sharing required for user cooperative communication, and is capable of effectively mitigating interference between users and improving the sum rate of the system. In addition, in this embodiment, the specific weighting matrix is constructed by using optimization of the weighted sum rate as a standard, which is capable of addressing the issue of maximizing the weighted sum rate on the interference channel.

Persons of ordinary skill in the art should understand that all or a part of the processes of the methods in the embodiments may be implemented by a computer program instructing relevant hardware. The program may be stored in a computer readable storage medium. When the program is run, the processes of the methods in the embodiments are performed. The storage medium may be a magnetic disk, an optical disk, a read-only memory (Read-Only Memory, ROM), a random access memory (Read-Only Memory, RAM) and the like.

Figure 7:
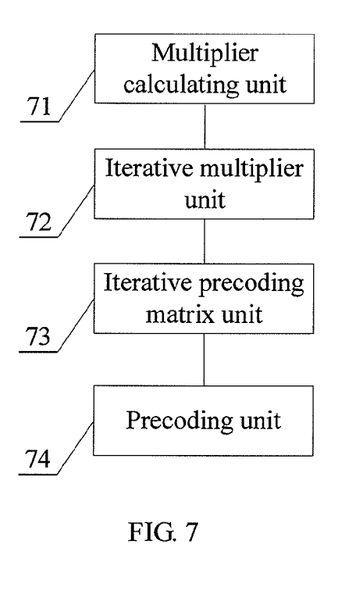
FIG. 7 is a schematic structural diagram of a precoding apparatus according to an embodiment of the present invention.

An embodiment of the present invention further provides a precoding apparatus. The precoding apparatus is arranged at a transmitting end, and as shown in FIG. 7, may specifically include a multiplier calculating unit 71, an iterative multiplier unit 72, an iterative precoding matrix unit 73 and a precoding unit 74. The multiplier calculating unit 71 is configured to construct a Lagrange function according to an initial precoding matrix, transmit power, a receive filter matrix and a weighting matrix, and obtain a Lagrange multiplier by using the Lagrange function. The iterative multiplier unit 72 is configured to update the precoding matrix according to the Lagrange multiplier to obtain an iterative precoding matrix. The iterative precoding matrix unit 73 is configured to obtain an iterative Lagrange multiplier according to the iterative precoding matrix, the transmit power, the receive filter matrix and the weighting matrix, and repeat the above steps in an iterative manner of updating the iterative precoding matrix according to the iterative Lagrange multiplier till the iterative precoding matrix converges to a threshold. The precoding unit 74 is configured to precode information to be transmitted according to the iterative precoding matrix converging to the threshold.

In addition, in the multiplier calculating unit 71, the weighting matrix is obtained by calculation using the following formula:

$$W_k = \frac{1}{\ln 2} \omega_k E_k^{-1},$$

where $W_k$ indicates a weighting matrix associated with a user k, $\omega_k$ indicates a weighting variable of the $k^{th}$ user, and $E_k^{-1}$ indicates an inverse matrix of an error matrix of the $k^{th}$ user.

In the iterative precoding matrix unit 73, the following step is included:

obtaining the iterative Lagrange multiplier by calculation according to the iterative precoding matrix, and obtaining the iterative precoding matrix by several iterative calculations according to the iterative Lagrange multiplier, where each iterative calculation uses the iterative precoding matrix obtained by a previous iterative calculation to obtain a new iterative Lagrange multiplier, the iterative precoding matrix satisfies a stop criterion, and the stop criterion includes:

the number of times of calculating the iterative precoding matrix reaching a predetermined value;

or, a Frobenius norm of the difference between the currently obtained iterative precoding matrix and the iterative precoding matrix obtained by the previous calculation being smaller than a threshold.

In addition, in the multiplier calculating unit 71, the receive filter matrix is obtained by calculation using the following formula:

$$R_k = v_l^H H_{kl}^H \left( \sum_{l=1}^{L} H_{kl} v_l v_l^H H_{kl}^H + \sigma_n^2 I \right)^{-1},$$

where L indicates the total number of transmitting ends, $R_k$ indicates a receive filter matrix of the $k^{th}$ receiving end, $v_l$ indicates a precoding matrix of the $l^{th}$ transmitting end, $v_l^H$ indicates a conjugate transpose matrix of $v_l$, $H_{kl}$ indicates a channel coefficient matrix from the $l^{th}$ transmitting end to the $k^{th}$ receiving end, $H_{kl}^H$ indicates a conjugate transpose matrix of $H_{kl}$, $\sigma_n^2$ indicates a channel noise variance, and I indicates a identity matrix.

In the multiplier calculating unit 71, the Lagrange multiplier is obtained by calculation using the following formula:

$$\Gamma(v_k : R_k : \lambda_k) = \sum_{k=1}^{K} \text{trace}(W_k MSE_k) + \sum_{k=1}^{K} \lambda_k [\text{trace}(v_l^H v_l) - P_l],$$

where $v_k$ indicates an initial precoding matrix of the $k^{th}$ transmitting end, $R_k$ indicates a receive filter matrix of the $k^{th}$ receiving end, $\lambda_k$ indicates a Lagrange multiplier, trace indicates a matrix trace, that is, the sum of diagonal elements in the matrix, $MSE_k$ indicates a mean square error matrix of the $K^{th}$ user, $W_k$ indicates a weighting matrix associated with a user k, $v_l^H$ indicates a conjugate transpose matrix of $v_l$, and $P_l$ indicates the total power of the $l^{th}$ transmitter.

In the iterative precoding matrix unit 73, the iterative precoding matrix is obtained by calculation using the following formula:

$$v_l = \left( \sum_{k=1}^{K} H_{kl}^H R_k^H W_k R_k H_{kl} + \lambda_k I \right)^{-1} H_{kl}^H R_k^H W_k,$$

where $v_l$ indicates an initial precoding matrix of the $l^{th}$ transmitting end, $H_{kl}$ indicates a channel coefficient matrix from the $l^{th}$ transmitting end to the $k^{th}$ receiving end, $H_{kl}^H$ indicates a conjugate transpose matrix of $H_{kl}$, $R_k$ indicates a receive filter matrix of the $k^{th}$ receiving end, $R_k^H$ indicates a conjugate transpose matrix of $R_k$, $\lambda_k$ indicates a Lagrange multiplier, and I indicates a identity matrix.

The specific implementation manner of the processing functions of the units included in the above apparatus has been described in the above method embodiment, which is not detailed here again.

By iteratively calculating the precoding matrix by using the Lagrange multiplier till the final precoding matrix converges to the threshold, this embodiment has the features of improving performance of a multi-user interference system, mitigating interference between users, and reducing information transfer and sharing required for user cooperative communication, and is capable of effectively mitigating interference between users and improving the sum rate of the system. In addition, in this embodiment, the specific weighting matrix is constructed by using optimization of the weighted sum rate as a standard, which is capable of addressing the issue of maximizing the weighted sum rate on the interference channel.

The foregoing descriptions are merely exemplary embodiments of the present invention, but not intended to limit the protection scope of the present invention. Any variation or replacement that can be easily thought of by persons skilled in the art within the technical scope of the present invention shall fall within the protection scope of the present invention. Therefore, the protection scope of the present invention shall be subject to the appended claims.

What is claimed is:

1. A precoding method, comprising:
constructing, by a multiplier calculating unit, a Lagrange function according to a precoding matrix, transmit power, a receive filter matrix and a weighting matrix, and obtaining a Lagrange multiplier by using the Lagrange function;
updating, by an iterative multiplier unit, the precoding matrix according to the Lagrange multiplier to obtain an iterative precoding matrix and an iterative receive filter matrix;
obtaining, by an iterative precoding matrix unit, an iterative Lagrange multiplier according to the iterative precoding matrix, the transmit power, the iterative receive filter matrix and the weighting matrix, and repeating the above steps in an iterative manner of updating the iterative precoding matrix according to the iterative Lagrange multiplier until the iterative precoding matrix converges to a threshold;
precoding, by a precoding unit, information to be transmitted according to the iterative precoding matrix converging to the threshold; and
wherein the weighting matrix is obtained by using the following formula:

$$W_k = \frac{1}{\ln 2} \omega_k E_k^{-1},$$

wherein $W_k$ indicates a weighting matrix associated with a $K^{th}$ user, $\omega_k$ indicates a weighting variable of the $k^{th}$ user, and $E_k^{-1}$ indicates an inverse matrix of an error matrix of the $k^{th}$ user.

2. The method according to claim 1, wherein repeating the above steps in an iterative manner of updating the iterative precoding matrix according to the iterative Lagrange multiplier until the iterative precoding matrix converges to a threshold comprises:
obtaining the iterative Lagrange multiplier by calculating the iterative precoding matrix, and obtaining the iterative precoding matrix by iterative calculations according to the iterative Lagrange multiplier, wherein each iterative calculation uses the iterative precoding matrix obtained by a previous iterative calculation to obtain a new iterative Lagrange multiplier, the iterative precoding matrix satisfies a stop criterion if converging to the threshold, wherein the stop criterion comprises: the number of times of calculating the iterative precoding matrix reaching a predetermined value; or, a Frobenius norm of a difference between the currently obtained iterative precoding matrix and the iterative precoding matrix obtained by the previous calculation being smaller than a threshold.

3. The method according to claim 1, wherein the iterative precoding matrix is obtained by calculation using the following formula:

$$v_l = \left( \sum_{k=1}^{K} H_{kl}^H R_k^H W_k R_k H_{kl} + \lambda_k I \right)^{-1} H_{kl}^H R_k^H W_k,$$

where $v_l$ indicates an initial precoding matrix of an $l^{th}$ transmitting end, $H_{kl}$ indicates a channel coefficient matrix from the $l^{th}$ transmitting end to a $k^{th}$ receiving end, $H_{kl}^H$ indicates a conjugate transpose matrix of $H_{kl}$, $R_k$ indicates a receive filter matrix of the $k^{th}$ receiving end, $R_k^H$ indicates a conjugate transpose matrix of $R_k$, $\lambda_k$ indicates a Lagrange multiplier, and I indicates a identity matrix.

4. The method according to claim 1, wherein the Lagrange multiplier is obtained by calculation using the following formula:

$$\Gamma(v_k : R_k : \lambda_k) = \sum_{k=1}^{K} \text{trace}(W_k MSE_k) + \sum_{k=1}^{K} \lambda_k [\text{trace}(v_l^H v_l) - P_l],$$

wherein $v_k$ indicates an initial precoding matrix of a $k^{th}$ transmitting end, $R_k$ indicates a receive filter matrix of a $k^{th}$ receiving end, $\lambda_k$ indicates a Lagrange multiplier, trace indicates a matrix trace, $MSE_k$ indicates a mean square error matrix of the $k^{th}$ user, $W_k$ indicates a weighting matrix associated with the $K^{th}$ user, $v_l^H$ indicates a conjugate transpose matrix of $v_l$, and $P_l$ indicates total power of an $l^{th}$ transmitter, wherein the matrix trace is a sum of diagonal elements in a matrix.

5. The method according to claim 1, wherein the receive filter matrix is obtained by calculation using the following formula:

$$R_k = v_l^H H_{kl}^H \left( \sum_{l=1}^{L} H_{kl} v_l v_l^H H_{kl}^H + \sigma_n^2 I \right)^{-1},$$

wherein L is the total number of transmitting ends, $R_k$ indicates a receive filter matrix of a $k^{th}$ receiving end, $v_l$ indicates a precoding matrix of an $l^{th}$ transmitting end, $v_l^H$ indicates a conjugate transpose matrix of $v_l$, $H_{kl}$ indicates a channel coefficient matrix from the $l^{th}$ transmitting end to the $k^{th}$ receiving end, $H_{kl}^H$ indicates a conjugate transpose matrix of $H_{kl}$, $\sigma_n^2$ indicates a channel noise variance, and I indicates a identity matrix.

6. A transmitting end in a distributed communications system, the transmitting end comprising:
a multiplier calculating unit, configured to construct a Lagrange function according to a precoding matrix, transmit power, a receive filter matrix and a weighting matrix, and obtain a Lagrange multiplier by using the Lagrange function;

an iterative multiplier unit, configured to update the precoding matrix according to the Lagrange multiplier to obtain an iterative precoding matrix and an iterative receive filter matrix;

an iterative precoding matrix unit, configured to obtain an iterative Lagrange multiplier according to the iterative precoding matrix, the transmit power, the iterative receive filter matrix and the weighting matrix, and repeat the above steps in an iterative manner of updating the iterative precoding matrix according to the iterative Lagrange multiplier until the iterative precoding matrix converges to a threshold;

a precoding unit, configured to precode information to be transmitted according to the iterative precoding matrix converging to the threshold; and wherein in the multiplier calculating unit, the weighting matrix is obtained by calculation using the following formula:

$$W_k = \frac{1}{\ln 2}\omega_k E_k^{-1},$$

wherein $W_k$ indicates a weighting matrix associated with a $K^{th}$ user, $\omega_w$ indicates a weighting variable of the $k^{th}$ user, and $E_k^{-1}$ indicates an inverse matrix of an error matrix of the $k^{th}$ user.

7. The transmitting end according to claim 6, wherein in the iterative precoding matrix unit, repeating the above steps in an iterative manner of updating the iterative precoding matrix according to the iterative Lagrange multiplier until the iterative precoding matrix converges to a threshold comprises:

obtaining the iterative Lagrange multiplier by calculating the iterative precoding matrix, and obtaining the iterative precoding matrix by iterative calculations according to the iterative Lagrange multiplier, wherein each iterative calculation uses the iterative precoding matrix obtained by a previous iterative calculation to obtain a new iterative Lagrange multiplier, the iterative precoding matrix satisfies a stop criterion if converging to the threshold, wherein the stop criterion comprises:

the number of times of calculating the iterative precoding matrix reaching a predetermined value;

or, a Frobenius norm of a difference between the currently obtained iterative precoding matrix and the iterative precoding matrix obtained by the previous calculation being smaller than a threshold.

8. The transmitting end according to claim 6, wherein in the iterative precoding matrix unit, the iterative precoding matrix is obtained by calculation using the following formula:

$$v_l = \left(\sum_{k=1}^{K} H_{kl}^H R_k^H W_k R_k H_{kl} + \lambda_k I\right)^{-1} H_{kl}^H R_k^H W_k,$$

where $v_l$ indicates an initial precoding matrix of an $l^{th}$ transmitting end, $H_{kl}$ indicates a channel coefficient matrix from the $l^{th}$ transmitting end to a $k^{th}$ receiving end, $H_{kl}^H$ indicates a conjugate transpose matrix of $H_{kl}$, $R_k$ indicates a receive filter matrix of the $k^{th}$ receiving end, $R_k^H$ indicates a conjugate transpose matrix of $R_k$, $\lambda_k$ indicates a Lagrange multiplier, and I indicates a identity matrix.

9. The transmitting end according to claim 6, wherein in the multiplier calculating unit, the Lagrange multiplier is obtained by calculation using the following formula:

$$\Gamma(v_k : R_k : \lambda_k) = \sum_{k=1}^{K} \text{trace}(W_k MSE_k) + \sum_{k=1}^{K} \lambda_k [\text{trace}(v_l^H v_l) - P_l],$$

where $v_k$ indicates an initial precoding matrix of a $k^{th}$ transmitting end, $R_k$ indicates a receive filter matrix of a $k^{th}$ receiving end, $\lambda_k$ indicates a Lagrange multiplier, trace indicates a matrix trace, $MSE_k$ indicates a mean square error matrix of the $k^{th}$ user, $W_k$ indicates a weighting matrix associated with the user k, $v_l^H$ indicates a conjugate transpose matrix of $v_l$, and $P_l$ indicates total power of a $l^{th}$ transmitter, wherein the matrix trace is a sum of diagonal elements in a matrix.

10. The transmitting end according to claim 6, wherein in the multiplier calculating unit, the receive filter matrix is obtained by calculation using the following formula:

$$R_k = v_l^H H_{kl}^H \left(\sum_{l=1}^{L} H_{kl} v_l v_l^H H_{kl}^H + \sigma_n^2 I\right)^{-1},$$

wherein L is the total number of transmitting ends, $R_k$ indicates a receive filter matrix of a $k^{th}$ receiving end, $v_l$ indicates a precoding matrix of an $l^{th}$ transmitting end, $v_l^H$ indicates a conjugate transpose matrix of $v_l$, $H_{kl}$ indicates a channel coefficient matrix from the $l^{th}$ transmitting end to the $k^{th}$ receiving end, $H_{kl}^H$ indicates a conjugate transpose matrix of $H_{kl}$, $\sigma_n^2$ indicates a channel noise variance, and I indicates a identity matrix.

11. A non-transitory computer medium comprising a computer program that, when executed by hardware, performs a precoding method comprising:

constructing a Lagrange function according to a precoding matrix, transmit power, a receive filter matrix and a weighting matrix, and obtaining a Lagrange multiplier by using the Lagrange function;

updating the precoding matrix according to the Lagrange multiplier to obtain an iterative precoding matrix and an iterative receive filter matrix;

obtaining an iterative Lagrange multiplier according to the iterative precoding matrix, the transmit power, the iterative receive filter matrix and the weighting matrix, and repeating the above steps in an iterative manner of updating the iterative precoding matrix according to the iterative Lagrange multiplier until the iterative precoding matrix converges to a threshold;

precoding information to be transmitted according to the iterative precoding matrix converging to the threshold; and wherein the weighting matrix is obtained by using the following formula:

$$W_k = \frac{1}{\ln 2}\omega_k E_k^{-1},$$

wherein $W_k$ indicates a weighting matrix associated with a $K^{th}$ user, $\omega_k$ indicates a weighting variable of the $k^{th}$ user, and $E_k^{-1}$ indicates an inverse matrix of an error matrix of the $k^{th}$ user.

* * * * *